United States Patent [19]

Hasegawa et al.

[11] Patent Number: 5,065,399
[45] Date of Patent: Nov. 12, 1991

[54] TELECOMMUNICATION NETWORK TROUBLE RECOVERY SYSTEM

[75] Inventors: Satoshi Hasegawa, Tokyo, Japan; Chiang H. Yang, Springfield, Va.

[73] Assignees: Bell Communications Research, Inc., Livingston, N.J.; NEC Corporation of Japan, Tokyo, Japan

[21] Appl. No.: 426,205

[22] Filed: Oct. 25, 1989

[30] Foreign Application Priority Data

Nov. 24, 1988 [JP] Japan ................... 63-296893

[51] Int. Cl.⁵ ............................ G06F 11/00
[52] U.S. Cl. .................. 371/11.2; 370/13.1
[58] Field of Search ............ 371/11.2, 20.1, 68.2, 371/8.2; 370/16, 13, 13.1

[56] References Cited

U.S. PATENT DOCUMENTS

| | | | |
|---|---|---|---|
| 4,382,294 | 5/1983 | Beuscher et al. | 370/16 |
| 4,402,082 | 8/1983 | Cope | 371/11.2 |
| 4,500,989 | 2/1985 | Dahod | 370/85.1 |
| 4,532,625 | 7/1985 | Stover | 370/16 |
| 4,536,874 | 8/1985 | Stoffel et al. | 370/85.4 |
| 4,608,684 | 8/1986 | Upp | 370/58.1 |
| 4,623,884 | 11/1986 | Ihara et al. | 370/16 |
| 4,704,714 | 11/1987 | Tomizawa et al. | 370/16 |
| 4,747,097 | 5/1988 | Ohya et al. | 370/16 |
| 4,763,316 | 8/1988 | Schaich et al. | 370/16 |
| 4,769,807 | 9/1988 | Niwa et al. | 370/16 |
| 4,785,450 | 11/1988 | Bolgiano et al. | 370/13 |
| 4,815,069 | 3/1989 | Nakayashiki et al. | 370/15 |
| 4,831,617 | 5/1989 | Iwasaki | 370/13 |
| 4,847,610 | 7/1989 | Ozawa et al. | 371/11.2 |
| 4,881,220 | 11/1989 | Yomogida et al. | 370/13 |
| 4,953,195 | 8/1990 | Ikemori | 370/13 |
| 4,964,095 | 10/1990 | Tyrrell et al. | 370/16 |

OTHER PUBLICATIONS

"Dynamic Reconfiguration of Digital Cross-Connect . . . ", S. Hasegawa et al., Proc. of Globecom '87, pp. 1096-1100, Nov. 87.
"A Fast Distributed Restoration Technique . . . ", W. D. Grover, Proc. of Global Comm. Conf., Tokyo, Nov. 87.
"Data and Computer Communications", William Stallings, pp. 256-262, Macmillan, 1985.

Primary Examiner—Charles E. Atkinson
Assistant Examiner—Phung My Chung
Attorney, Agent, or Firm—Leonard C. Suchyta; Lionel N. White

[57] ABSTRACT

Rapid restoration of a telecommunication path between network nodes after an interrupting network link failure utilizes a distributed system of selective flooding for dynamically reconfiguring the internodal path in a manner which will ensure the most economical use of intermediate links. A help message transmitted from one of the terminating nodes to each contiguous neighboring node requests use of the uncommitted bandwidth of each respective link. This wave of messages is propagated selectively, along paths having maximum available bandwidth and least number of links, through the network by each successive receiving node until the help message reaches the other terminating node of the failed link. An acknowledgement message returned to the initial terminating node via propagation links offering the maximum bandwidth establishes a reconfigured path providing the greatest bandwidth recovery. In the event that such a path does not completely satisfy the original bandwidth requirement, additional paths are established by successive waves of request messages until the balance of the requirement is met.

11 Claims, 6 Drawing Sheets

TELECOMMUNICATION NETWORK TROUBLE RECOVERY SYSTEM

BACKGROUND OF THE INVENTION

Rapid advances in fiber optics and VLSI technologies have made intelligent, high-speed telecommunication transport systems increasingly available to network providers. In such high-speed optical fiber networks carrying, for example, multiple gigabits per second of information, the failure of a key carrier link can result in an enormous loss of bandwidth and correspondingly great loss of service to users. Consequently, automatic network restoration is one of the most essential elements in the effective operation of these telecommunicatin networks.

A number of restoration systems have previously been proposed, but none has the capability of providing the economies of both time and facilities that are required in the expanding telecommunication fiber networks. For example, while the technique of diversely routed automatic protection switching can provide substantially complete recovery with a response time of about 50 milliseconds, the required redundancy of dedicated bandwidth results in a most inefficient utilization of equipment and network facilities. Somewhat more effective systems have been made possible, however, as highly intelligent digital cross-connect equipment is being broadly deployed throughout the networks, yet these generally are lacking in speed or are excessively complex.

One such recovery system which relies upon centralized management to reconfigure a network around a failure is described by Hasegawa et al. in "Dynamic Reconfiguration of Digital Cross-Connect Systems with Network Control and Management," Proc. of Global Communications Conference, November 1987. While such a centralized method can recover from individual logical switch problems as well as physical link failures, the extensive communication necessary between the control and operating elements of the system taxes available facilities and extends response time to as much as thirty minutes. On the other hand, a distributed recovery method, such as discussed by Grover in "The Selfhealing Network: A Fast Distributed Restoration Technique for Networks Using Digital Cross-Connect Machines," Proc. of Global Communication Conference, November 1987, with its inherent parallel processing achieves significantly higher response times, yet it suffers from message overloading due to the uncontrolled "flooding" (see Stallings, "Data and Computer Communications," Macmillan, 1985, pp. 256-261) employed in intrasystem message propagation.

Unlike these prior systems, the present invention utilizes a method of selective message propagation among digital cross-connect devices to yield a distributed control technique that provides an effective network restoration system having a degree of rapid response time and minimal communication congestion not previously available.

SUMMARY OF THE INVENTION

The present invention is particularly adapted to restoring communication between nodes that terminate a failed link in a high-speed transport system, such as the Synchronous Optical Network (SONET) prescribed by American National Standard, ANSI T1.105-1988, "Digital Hierarchy Optical Interface Rates and Formats Specification," 10 Mar. 1988. Such a network may normally be a fiber optic arrangement comprising broadband digital cross-connect systems (DCS) connecting network links at the STS-1 level (Synchronous Transport Signal level 1, 51.84M bit/s). Since the network will not uncommonly be utilized in applications, such a broadband ISDN, requiring multiple STS-1 bands, it is of particular advantage that the present network recovery procedure is designed to locate the restoration path, or paths if necessary, having the largest contiguous bandwidth to thereby economically restore the interrupted service.

Restoration of a network failure employing the distributed selective broadcast processing of the invention utilizes the embedded SONET overhead channels to conveniently provide the necessary communication among the DCSs which will be involved in the recovery procedure. It is by means of these channels that the various processing messages may be exchanged between node DCSs in the course of reconfiguring the necessary path or paths between the terminating nodes of the failed network link.

Once a terminating node recognizes a failure in its communication link that is not otherwise remedied, as by an Automatic Protection Switching System, the present recovery system is initiated. Of the two terminating nodes one is arbitrarily designated, for example on the basis of having the lower identification or address number, to assume the role of Sender (SND) and the other becomes the Chooser (CHS) for the given recovery situation. At the outset, SND transmits a "help" message to all other adjacent nodes whose links with SND currently having at least STS-1 uncommitted bandwidth. This message identifies the SND-CHS pair and requests the receiving node to commit all its spare bandwidth, up to a maximum of the bandwidth lost in the failure, to recovery of the failed network link. In addition, the message includes a "hop" number, i.e. an indication of the position of the transmitting node in the chain of communication. Node SND thus notes a hop number of "1".

Each receiving node records the message data, namely the SND-CHS identification, the identification of the node from which the message was received, the bandwidth requested, and the hop number. Each such node examines the recorded data, selects the message with the highest bandwidth request, and prepares messages to its adjacent nodes requesting all spare bandwidth available on the respective links up to the maximum specified in the selected message. The node then substitutes its own identification in each message, increments the hop number by one and broadcasts the messages. In like manner each further receiving node adds request data to its chart record and forwards the appropriate maximum bandwidth request messages to its adjacent nodes. Thus the ultimate request messages eventually reaches the CHS node to be charted there in its table.

Upon expiration of a predetermined time after initiation of the recovery process, CHS examines its data chart and chooses from among the recorded messages the one specifying the greatest bandwidth. CHS then transmits an acknowledgement message to the node from which that request message was received and that requester node (RQR) confirms the availability of the specified bandwidth. RQR then likewise exchanges acknowledgement/confirmation messages with the node from which it received the message specifying the greatest available bandwidth. This procedure is repeated back along the broadcast links until the acknowledgement reaches SND, thereby establishing the highest capacity restoration path between SND and CHS. After completion of the confirmation phase of the process, the involved nodes complete the cross-connections and the SND-CHS link is restored.

In the event that the bandwidth thus restored is insufficient to recover all that was lost in the failure, SND initiates a second wave of request messages under the same guidelines as noted above. The selected path through the network will then naturally follow, in most instances, the second highest capacity links initially identified during the first wave. This selective broadcast procedure may be repeated as many times as needed to recover the entire failed link, provided the allotted processing time is not exceeded. In this respect, the process parameters will ordinarily be set to recover most anticipated failures in the approximately two second period before trunk conditioning occurs.

THE DRAWING

The present invention will be described with reference to the accompanying drawing of which:

DESCRIPTION OF THE INVENTION

Figure 1:
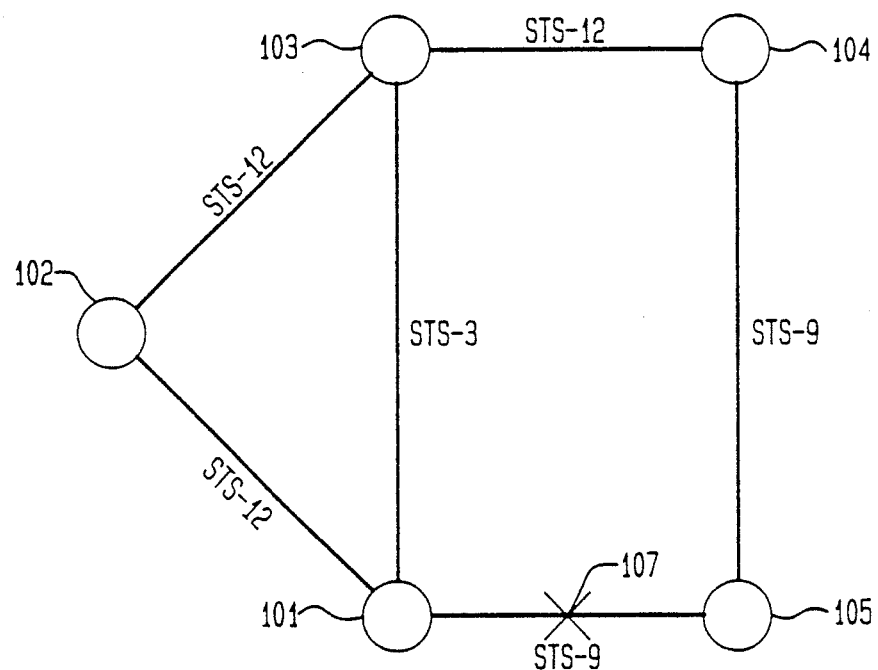
FIG. 1 shows a map diagram of a simplified telecommunications network to which the recovery procedure of the present invention is to be applied.

A simplified telecommunication network, as represented in FIG. 1, comprises a number of nodes, 101-105, variously interconnected by communication links, such as optical fiber cable. Each such link will ordinarily be designed to carry significant transmission bandwidth of a multiplicity of basic STS-1 capacity. Since these internodal links will rarely be committed to their capacity in active communication transmission, some bandwidth will normally be available for assignment to such transmission. Such spare bandwidth is indicated in the exemplary network of FIG. 1 as multiples of the basic STS-1 (51.84M bits/sec.) unit, for example STS-12 (622.08M bit/s) being available in the link between nodes 101, 102. Completing the setting for the following description of this example of the network recovery process of the invention is the interruption, shown at 107, in the STS-9 link between nodes 101, 105. The object of this process is thus to utilize the bandwidth available in selected ones of the various network links to most economically reroute the communication between nodes 101, 105 with complete STS-9 bandwidth.

At the outset of the procedure, the nodes terminating the interrupted link, here 101, 105, are arbitrarily designated, such as on the basis of a numerical ranking of address, as the Sender (SND) and the Chooser (CHS) nodes. In our example then, node 101 is SND and node 105 is CHS. Having been thus selected, SND 101 begins to construct an initial request message, as at step 501 in FIG. 5, which includes the respective addresses of SND and CHS, and a control identification. SND then identifies each of its linked neighbors, i.e. nodes 102, 103, and their available link bandwidth, respectively STS-12, STS-3, and completes specific request messages which are individually transmitted to each of them.

Figure 2:
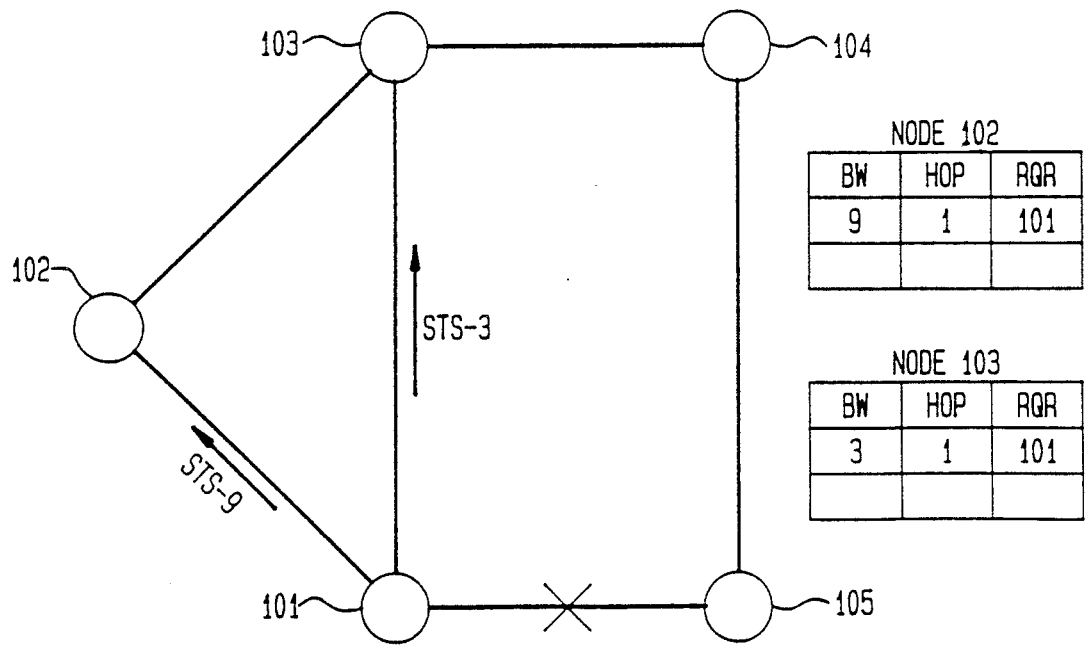
FIG. 2 shows a map diagram and hop chart listings for the initial stage in the recovery procedure.

Based on the fact that STS-9 bandwidth was lost due to the interruption at 107, SND requests all, or as much as is available, of that bandwidth from each of its neighbors. As depicted in FIG. 2, the message to node 102 thus requests only STS-9 of the STS-12 spare bandwidth on that link. The message additionally identifies node 101 as the transmitter of the request, i.e. the requester (RQR), and specifies the number of links, i.e. "hops" encountered in reaching the addressee, node 102. The message sent to node 103, on the other hand, requests only STS-3 bandwidth, the maximum available on that link.

Figure 3:
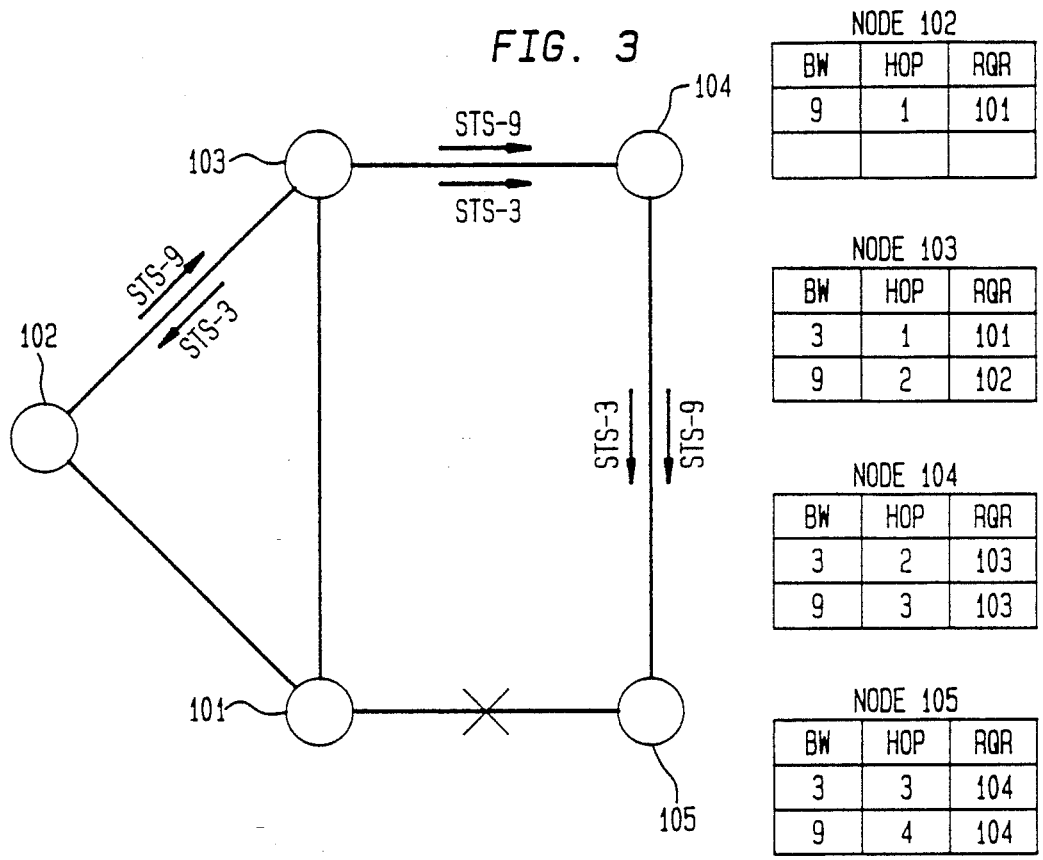
FIG. 3 shows a map diagram and hop chart listings for further stages in the recovery procedure.
Figure 4:
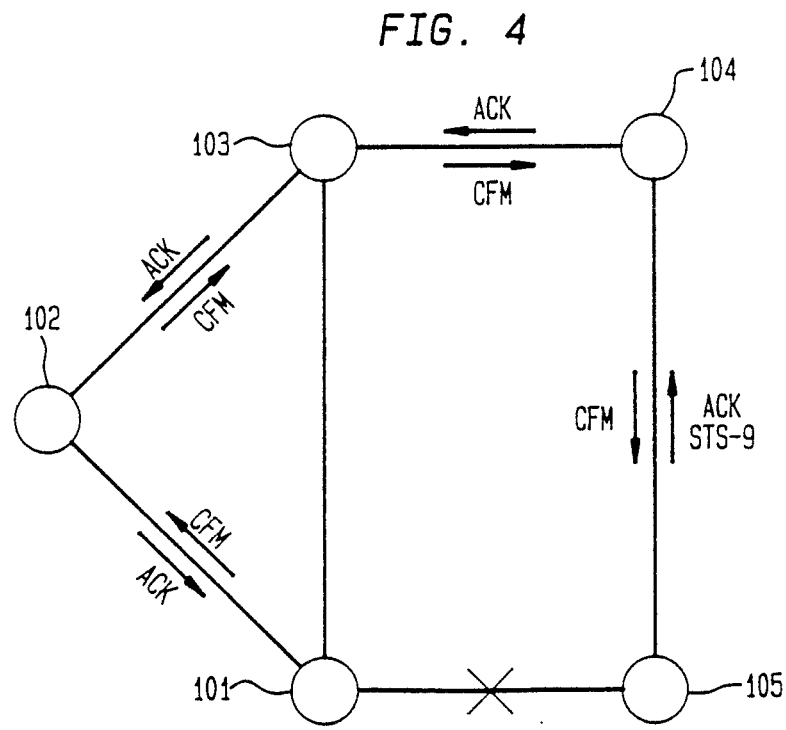
FIG. 4 shows a map diagram for concluding acknowledgement and confirmation stages in the recovery procedure.

Upon receiving a request, each node records in a table, such as shown in FIG. 2, the pertinent message data, namely the hops (HOP), the identity of the message transmitter (RQR), and the requested bandwidth (BW), provided that such bandwidth is not less, nor the hop count greater for the same bandwidth, than any previously requested. Thus, the table of node 102 records the receipt, after one hop, of a request from node 101 for STS-9 bandwidth, and that of node 103 notes an initial request for STS-3 from SND 101. As depicted in FIG. 3, each recipient node constructs its own request messages in which it identifies itself as RQR, requests the maximum needed or available bandwidth, and increments the hop count by one. These messages are transmitted to all neighboring nodes, and the data are recorded in the node tables where appropriate. Node 103 thus records the request from node 102 for STS-9 bandwidth after two hops, i.e. 101-102-103. Node 102, however, upon receiving the request for STS-3 from node 103, does not record that message data, since its table shows a prior request for STS-9. As a result, the message is in effect discarded and its propagation terminated for the current wave of requests.

During the course of the process preceding a predetermined timeout for the current spread stage of a wave of request messages, node 105 (CHS) records, according to the noted guidelines, all incoming request messages that have been able to propagate through the network to its terminus. The table of CHS, as shown for node 105, records in that time span requests from node 104 for STS-3 on three hops (101-103-104-105) and for STS-9 on four hops (101-102-103-104-105). Note, that these messages were obviously received in that order, since the lesser BW request would otherwise have been discarded.

At the occurrence of the spread stage timeout, CHS selects from its table the entry indicating the request for the greatest bandwidth and returns to the requester (RQR) identified in that entry an acknowledgement (ACK) message specifying such bandwidth. If the indicated bandwidth remains available, RQR confirms (CFM) the acknowledgement message and forwards to its greatest bandwidth requester, according to its data table, an ACK message of its own for the confirmed bandwidth. Should the link, however, be unavailable for any reason, such as commitment or loss of contention to a contemporary recovery process, SND will timeout and begin a new spread wave after a reasonable delay from the current wave timeout. In this manner, assuming satisfactory CFM messages throughout, each link in the most effective propagation chain is traced back to SND along the reconstructed communication line from CHS. Upon confirmation by SND, the cross-connect equipment at the confirmed nodes then complete the link connections to recover the STS-9 bandwidth communication between nodes 101 and 105 along the four-hop path 101-102-103-104-105.

In the event that the entire bandwidth of the failed link is not recovered in a single wave of request messages, SND simply initiates a second wave by requesting the balance of the bandwidth loss over available links. Additional waves are likewise initiated until all bandwidth is recovered, or until the procedure is terminated upon a process timeout just prior to the onset of trunk conditioning at about two seconds after the original link failure. In view of this time constraint, consideration must be given to the basic timing factors influencing the selection of the timeout for the wave spread process of the recovery procedure, namely the algorithm execution time at each node and the time for message transmission between nodes. Significant leeway is normally allowable in setting this timeout parameter; however, it should be borne in mind that while a shorter processing timeout may enable more waves, the restoration paths will be short and often incomplete, resulting in limited recovery. A similar undesirable result will unfortunately occur if the timeout is excessive, since fewer of the possibly necessary waves may be completed prior to trunk conditioning.

Figure 8:
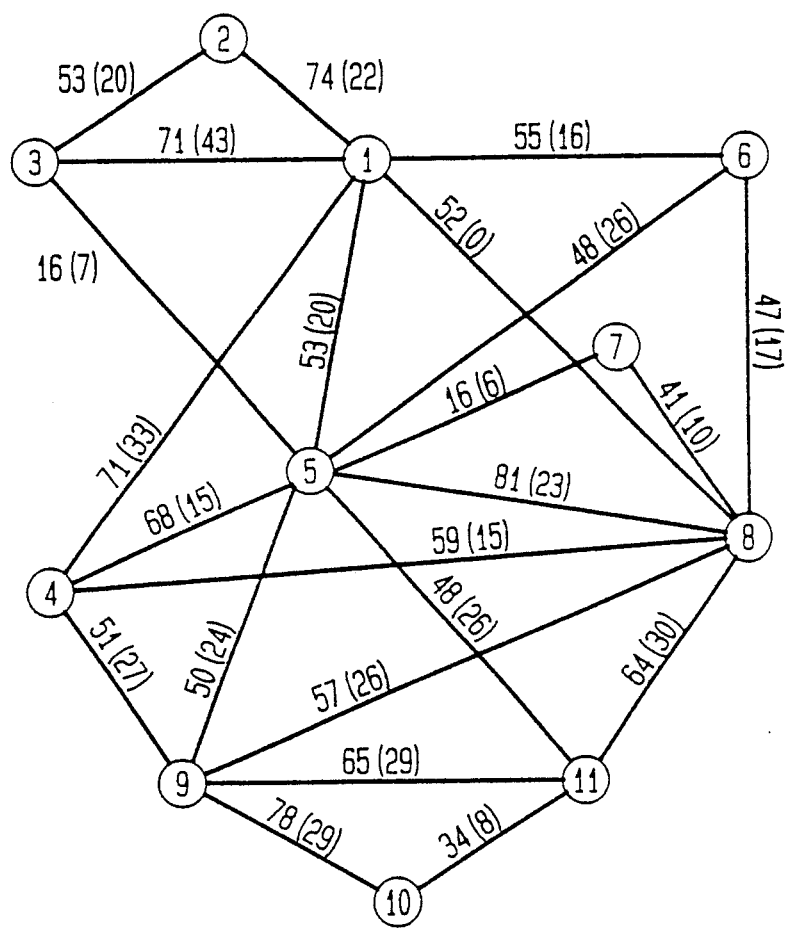
FIG. 8 is a diagrammatic representation of an exemplary network showing bandwidths of internodal links.
Figure 9:
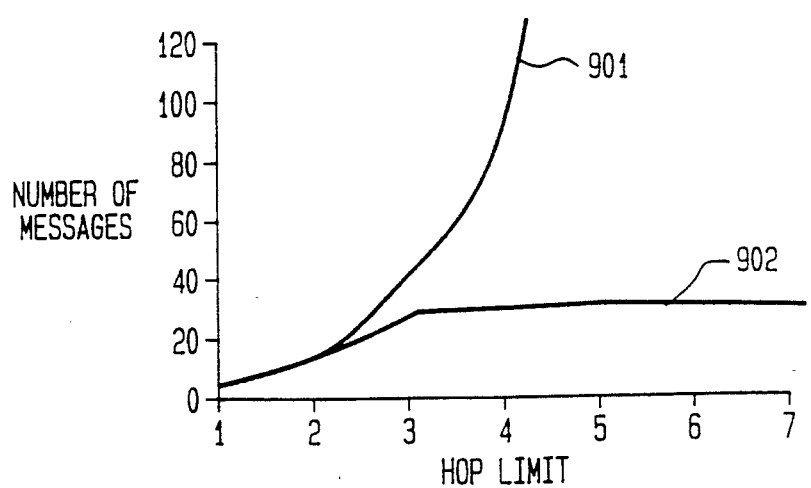
FIG. 9 is a graphic representation of the comparative network loading during recovery procedures of the prior art and of the present invention.

From a series of emulations of failure recovery utilizing a Motorola 68000 based UNIX microcomputer for a sample network such as depicted in FIG. 8, we estimate that a mean processing time of about 10-20 msec. is generally sufficient to execute the message preparation and transmission algorithm at each node. Further, we have determined that messages of about 80 bytes are sufficient in carrying out the recovery process, thus requiring about a ten msec. transmission time on a SONET 64 kb/s overhead channel for each such message. The additional variable parameter of a hop limit for each message chain provides a final major consideration. In our emulations we have employed a five hop limit which appears to be an economical selection in that it provides for a maximum number of messages in any wave, as may be observed in curve 902 of FIG. 9. From these factors we have been able to conclude that a wave spread timeout period in the range of about 200-500 msec. will generally enable complete bandwidth recovery of a failed communication link.

Figure 5:
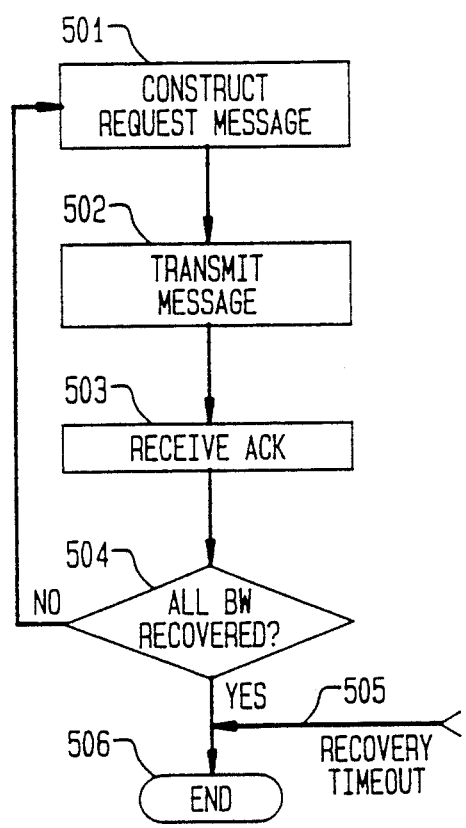
FIG. 5 is a flow diagram of the steps of the recovery procedure carried out at the Sender node.
Figure 6:
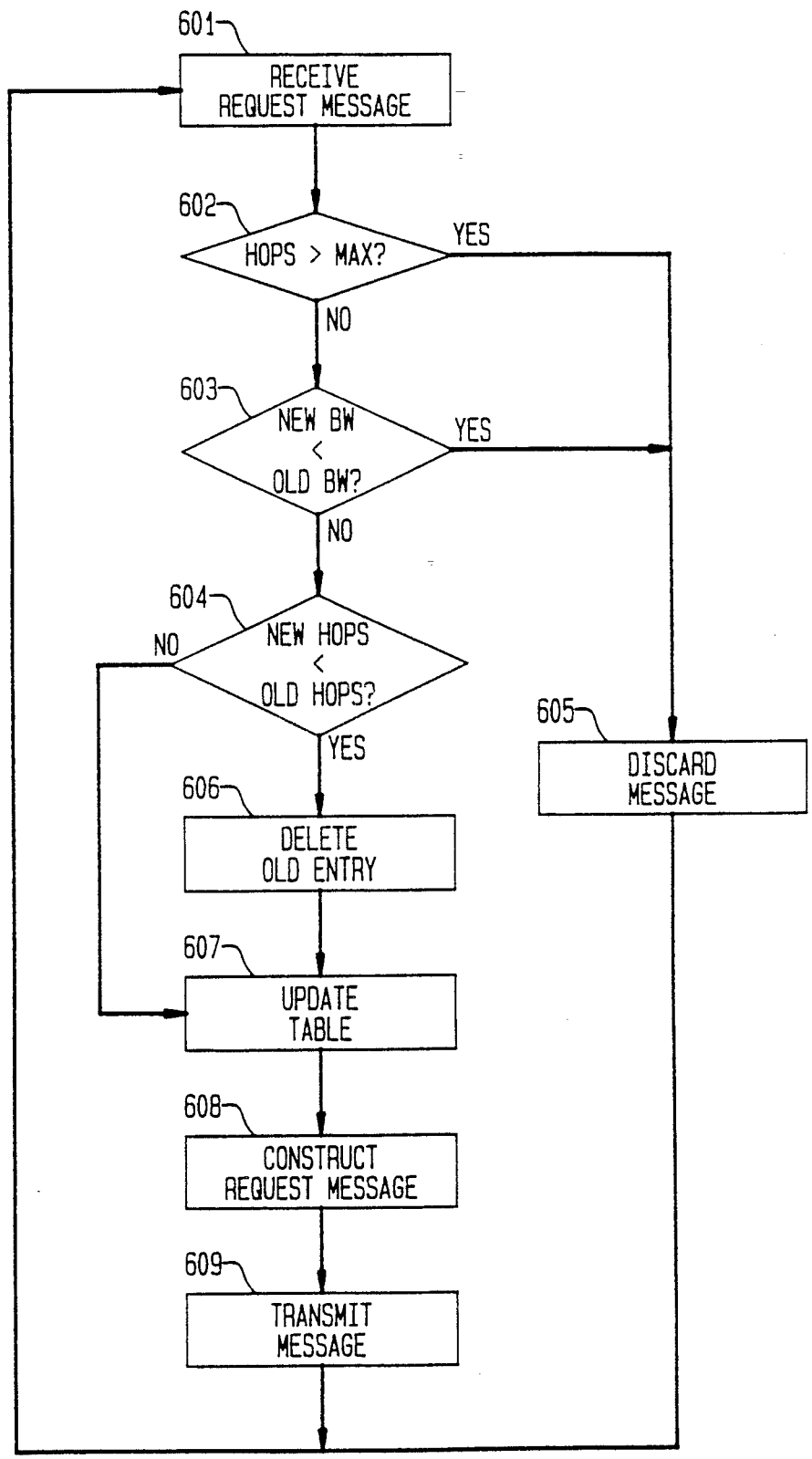
FIG. 6 is a flow diagram of the steps of the recovery procedure carried out at intermediate nodes.
Figure 7:
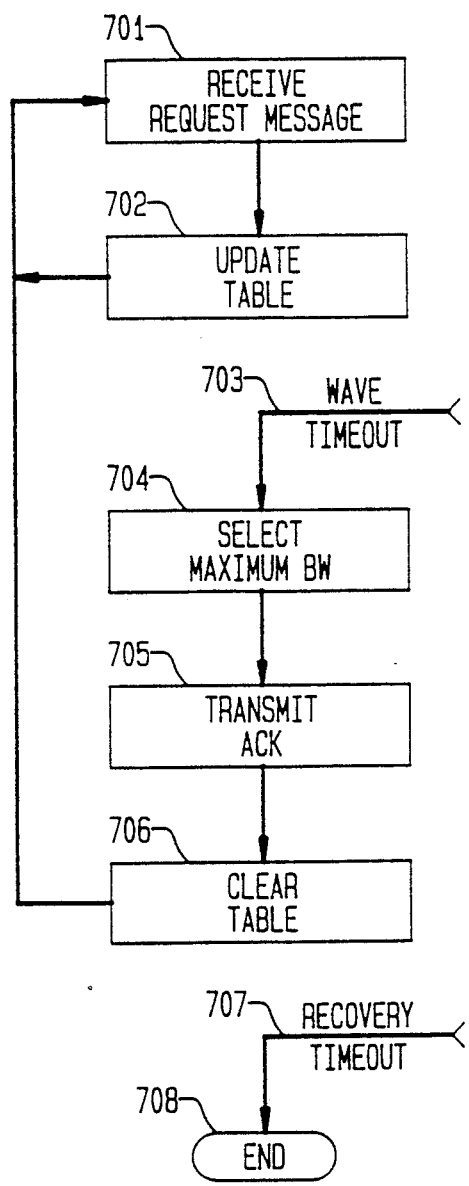
FIG. 7 is a flow diagram of the steps of the recovery procedure carried out at the Chooser node.

The recovery procedure of the present invention may be implemented in the process steps depicted in the flow diagrams of FIGS. 5-7. This procedure is initiated when the terminating nodes of a failed link, for example nodes 4 and 8 of the sample network of FIG. 8, are alerted by existing switch elements that the failure has not been recovered by alternate means, such as an automatic switch protection system. As indicated in FIG. 8, this node 4-8 link failure involves STS-59 of active bandwidth and STS-15 of spare bandwidth, i.e. bandwidth not currently in use. The bandwidth status, i.e. active and (spare), for each of the other links in the network at the time of the failure is likewise designated in FIG. 8. According to the arbitrary selection criterion suggested previously, the lower address node 4 assumes the role of Sender (SND) during the process, while node 8 is CHS.

In FIG. 5, which lists its primary operations during the recovery process, SND constructs, at step 501, an initial request message according to the earlier-noted guidelines. This message specifies in addition to a basic control designation and the failed link identity, 4-8, the address of SND and the hop number of the message, i.e. "1" since the message is originating with SND. To these data SND adds further information peculiar to the node to which it is to be directed, e.g. node 1, namely the address of node 1 and the bandwidth requested. In the initial wave of the present example, SND requests of node 1, in the transmission of step 502, STS-33 of the lost STS-59 bandwidth, since that is the maximum available on the 4-1 link. In like manner, SND requests STS-15 of node 5 and STS-27 of node 9. After transmitting its request messages, SND waits until an acknowledgement (ACK) message is received, at step 503. It will be apparent upon close analysis of the application of the present procedure in this example that a single acknowledgement message, specifying the greatest available bandwidth, will be received by SND in any one wave of request messages.

SND compares, at 504, the recovered bandwidth specified in ACK with its recorded table of outstanding lost bandwidth to determine if all such bandwidth has been recovered. If a complete bandwidth recovery has been achieved, or if the two second timeout, at 505, preceding trunk conditioning occurs, the process ends, at step 506; otherwise it loops back to another request message construction, at step 501, to begin a second wave of requests. In the example under consideration, the first ACK indicates a recovery of only STS-27 (path 4-9-11-8) of the STS-59 lost in the failure; therefore, in an attempt to recover the outstanding STS-32, SND initiates a second wave with a request for STS-32 of node 1 (the maximum required of the STS-33 available), STS-15 of node 5 (the maximum available on that link), and nothing of node 9 since that link was completely utilized in the first wave. An responding ACK of STS-20 (path 4-1-5-8) causes SND to begin a third wave which completes the recovery of the balance of STS-12 (path 4-5-9-8).

Each intermediate node in the network performs the operations depicted in FIG. 6, beginning with the receipt of a request message, at 601, and comparison of its data with that currently recorded in the node table. The specified maximum hop parameter common to all nodes during the process has been noted in each table and is compared, at 602, with the hop count carried by the incoming message. If the hop count exceeds the maximum, the message is discarded, at 605, thereby terminating further attempts to complete a recovery via that overextended path. A satisfactory message is next examined, at 603, to ensure that the requested bandwidth is not less than that which has previously been requested of the node, in which case the message is likewise discarded, at 605. It is this selective character of the algorithm that distinguishes in great measure the present recovery process from previous flooding procedures which allow substantially unlimited request message propagation and lead to congestive queueing and processing delays at hub nodes.

In the event that the message requests a bandwidth that is equal to one earlier recorded, thus qualifying it for retention, the message hop count is compared, at 604, with that of the prior table entry. A greater recorded hop count request is deleted from the table, at 606, in favor of entry of the new request, at 607, to update the node table, thus providing a further facet of selectivity in the recovery process. Incoming requests of greater or equal hop count are simply entered as a table update, at 607. The node then constructs a request message, at 608, based upon the maximum bandwidth request then recorded in the table and, in the same manner as SND, increments the hop count and transmits the message to neighboring nodes, at 609, requesting the greatest available bandwidth up to that maximum. The process then returns to step 601 where the node awaits further requests which may be forthcoming in subsequent waves.

The operations at CHS follow the chart of FIG. 7 in which each message received, at 701, is evaluated, in the manner used at intermediate nodes, for maximum bandwidth and minimum hop count and is added to the CHS table, all as indicated as table updating at 702. Since CHS does not further propagate the request messages, the procedure loops back to 701 to receive and process additional such messages until such time as the process-specified wave timeout occurs, as at 703. CHS then examines its table of request data and selects, at 704, a request with the greatest bandwidth and transmits, at 705, an acknowledgement (ACK) message to the identified RQR. Upon receiving a confirming (CFM) message from RQR, CHS clears its table, at 706, and returns to step 701 to await a subsequent wave of requests. Each RQR in turn responds similarly to the ACK message by executing steps 704-706 to select a maximum recorded bandwidth and acknowledge the same to the appropriate RQR until the request path ultimately returns to SND. As noted previously, the approximately two second recovery process timeout 707 may occur at any stage, thereby causing the procedure to abort, at 708.

In common network arrangements the several fibers connecting one node to another may be situated within a single conduit. Thus, there may be several logical connections between the two nodes, yet only one physical connection. It will be apparent, then, that many network failures will occur in the event of damage to the single conduit. In such a multiple failure situation, numerous recovery processes are initiated, and each involved node responds to requests in the manner described above, maintaining a separate table for each SND-CHS pair process. Allocation of spare bandwidth is decided on a simple first-come, first-served basis with confirmation failures due to prior link allocation resulting in a SND timeout and spread wave renewal, as earlier noted. Contentions for a single link allocation are likewise resolved by the transmission of repeated ACK messages after a commonly-employed random "back-off" waiting period.

The failure recovery process of the present invention has the ability of uniting the distributed intelligence of digital cross-connect systems to autonomously restore SONET communications in near real time with economical use of available facilities. The key advantage of the procedure is its ability to intelligently use surviving connectivities and spare bandwidth to respond to a variety of failure situations, including multiple link failures. Unlike the uncontrolled flooding of previous distributed network restoration procedures, the selective message broadcasting of the present process enables cross-connect facilities to achieve fast response times with minimal message transmission and the avoidance of congestion delays. This critical distinction is readily apparent in FIG. 9 which shows the comparative message generation resulting, at 901, from earlier unlimited flooding procedures and, at 902, from the selective broadcasting employed in the present invention. Whereas the present process is self-limiting in its use of the network switching and transmission facilities, prior methods propagate restoration request messages at an exponential rate that quickly saturates the network and prevents effective failure recovery.

Having thus disclosed the invention, we anticipate that other embodiments will be apparent from the foregoing description to those of ordinary skill in the art. Such embodiments are likewise to be considered within the scope of the invention as set out in the following appended claims.

What is claimed is:

1. A method of recovering a failed communication link between first and second terminus nodes in a telecommunication network which comprises:
    a) identifying one or more multi-link network paths extending between said first and second terminus nodes wherein each of said links affords spare bandwidth equal to all or a portion of the communication bandwidth lost in said failure;
    b) selecting the one of said network paths that affords the largest minimum bandwidth link; and
    c) establishing said one network path as the communication line between said first and second terminus nodes.

2. A method according to claim 1 wherein said identifying of a multi-link path comprises:
    a) transmitting from the first of said terminus nodes to a recipient node connected thereto by a link affording spare bandwidth a message specifying a bandwidth which is the lesser of the bandwidth required to recover said failure and the maximum spare bandwidth afforded on said link;
    b) transmitting from a recipient node to a subsequent node connected thereto by a link affording spare bandwidth a revision of said message specifying a bandwidth which is the lesser of the bandwidth specified in the message received by the recipient node and the maximum spare bandwidth afforded on said link; and
    c) repeating step b) up to a predetermined maximum number of times at each recipient node except the second of said terminus nodes.

3. A method according to claim 1 wherein said identifying of multi-link paths comprises:
    a) broadcasting from the first of said terminus nodes to each recipient node connected thereto by a link affording spare bandwidth a message specifying a bandwidth which is the lesser of the bandwidth required to recover said failure and the maximum spare bandwidth afforded on said link;
    b) broadcasting from each recipient node to each subsequent node connected thereto by a link affording spare bandwidth a revision of the received message specifying a bandwidth which is the lesser of the bandwidth specified in the message received by the respective recipient node and the maximum spare bandwidth afforded on said link; and c) repeating step b) up to a predetermined maximum number of times at each recipient node except the second of said terminus nodes.

4. A method according to claim 3 wherein said selecting of one network path comprises:
   a) selecting at the second of said terminus nodes the adjacent node from which was received the message specifying the maximum bandwidth;
   b) selecting at said adjacent node the next adjacent node from which was received the message specifying the maximum bandwidth;
   c) repeating step b) at each said next adjacent node except the first of said terminus nodes; and
   d) selecting as said one network path the links extending respectively between said adjacent nodes.

5. A method according to claim 4 wherein said establishing of one network path as the communication line comprises cross-connecting said selected path links at said adjacent nodes.

6. A method of recovering a failed communication link between first and second terminus nodes in a telecommunication network which comprises:
   a) broadcasting from the first of said terminus nodes to each recipient node connected thereto by a link affording spare bandwidth a message comprising the identity of the first broadcasting node and the specification of a bandwidth which is the lesser of the bandwidth required to recover said failure and the maximum spare bandwidth afforded on said link;
   b) recording at each recipient node the bandwidth specified in each respective message received at said recipient node and the identity of the node from which said message was received;
   c) broadcasting from each recipient node to each subsequent node connected thereto by a link affording spare bandwidth a revision of the received message comprising the identity of the then broadcasting node and the specification of a bandwidth which is the lesser of the maximum bandwidth then on record at the respective recipient node and the maximum spare bandwidth afforded on said link;
   d) repeating up to a predetermined maximum number of times step b) and, except at the second of said terminus nodes, step c);
   e) after a predetermined period of time following said failure, identifying from the data recorded at the second of said terminus nodes the adjacent node from which was received the message specifying the maximum bandwidth;
   f) transmitting from said second terminus node to the identified adjacent node a message acknowledging said maximum bandwidth;
   g) identifying from the data recorded at the adjacent node the next adjacent node from which was received the message specifying the maximum bandwidth;
   h) transmitting from the adjacent node to the identified next adjacent node a message comprising the initial bandwidth acknowledgement;
   i) repeating steps g) and h), except at the first of said terminus nodes; and
   j) cross-connecting the respective acknowledged bandwidth links at the identified nodes therebetween.

7. A method according to claim 6 which further comprises deleting said recorded data and repeating the recited steps until all bandwidth lost in said failed communication link has been recovered.

8. A method according to claim 6 which further comprises:
   a) including in each broadcast message the specification of the number of internodal broadcast hops said message then represents; and
   b) retaining on record at any node only the one message which, as between two messages specifying the same bandwidth, specifies the lesser number of said hops.

9. A method of recovering a failed communication link between first and second terminus nodes in a telecommunication network wherein the first of said terminus nodes broadcasts on links to neighboring nodes a path restoration request message which is further broadcast by subsequent neighboring nodes, the second of said terminus nodes receives various of said broadcast messages from neighboring nodes and returns messages to said first terminus node on path links utilized for said broadcast messages, and network recovery paths are established on said return message paths characterized in that
   a) the initial broadcast messages identify the then broadcasting node and specify a bandwidth which is the lesser of the bandwidth required to recover said failure and the maximum spare bandwidth afforded on the broadcast link;
   b) each further broadcast message identifies the then broadcasting node and specifies a bandwidth which is the lesser of the bandwidth specified in the message received by said broadcasting node and the maximum spare bandwidth afforded on the broadcast link;
   c) said second terminus node returns a message to said first terminus node only on the path whose initial link is to the second terminus neighboring node whose request message specified the maximum bandwidth; and
   d) a network recovery path is thereby established which affords the largest minimum bandwidth link.

10. A method according to claim 9 characterized in that
    the steps of establishing a network recovery path are repeated until all bandwidth lost in said failed communication link has been recovered.

11. A method according to claim 9 characterized in that
    a) each broadcast message includes the specification of the number of internodal broadcast hops said message then represents; and
    b) said return message path is further limited to subsequent links to neighboring nodes whose request message specified the maximum bandwidth and, as between two messages specifying the same bandwidth, specified the lesser number of said hops.

* * * * *